United States Patent [19]

Wagensonner

[11] 4,190,343

[45] Feb. 26, 1980

[54] PHOTOGRAPHIC CAMERA WITH EXPOSURE CONTROL UTILIZING A PHASE CONTROLLABLE CRYSTAL

[75] Inventor: Eduard Wagensonner, Aschheim, Fed. Rep. of Germany

[73] Assignee: Agfa-Gevaert AG, Leverkusen, Fed. Rep. of Germany

[21] Appl. No.: 608,326

[22] Filed: Aug. 27, 1975

Related U.S. Application Data

[63] Continuation-in-part of Ser. No. 392,807, Aug. 23, 1973, abandoned.

[30] Foreign Application Priority Data

Aug. 31, 1972 [DE] Fed. Rep. of Germany ....... 2242809

[51] Int. Cl.$^2$ ................................................. G03B 9/56
[52] U.S. Cl. ..................................... 354/227; 354/50; 354/60 R; 350/330
[58] Field of Search ................. 354/50, 51, 60 R, 227, 354/226; 350/160 LC

[56] References Cited

U.S. PATENT DOCUMENTS

| | | | |
|---|---|---|---|
| 3,433,139 | 3/1969 | Beyen et al. | 354/227 |
| 3,476,029 | 11/1969 | Schreckendgust | 354/227 |
| 3,641,891 | 2/1972 | Burgarella | 354/51 |
| 3,795,436 | 3/1974 | Boller et al. | 350/160 LC |
| 3,815,982 | 6/1974 | Wagensonner | 354/227 |
| 3,849,786 | 11/1974 | Nanba et al. | 354/51 |
| 3,890,628 | 6/1975 | Gurtler | 354/227 |

Primary Examiner—Russell E. Adams
Attorney, Agent, or Firm—Michael J. Striker

[57] ABSTRACT

A high speed light measuring circuit utilizing a photodiode is combined with a high speed exposure terminating circuit utilizing two polarized filters and a liquid or ferroelectric crystal placed between the polarized filters to constitute an exposure control circuit operative without modification for both daylight and flash exposure.

7 Claims, 1 Drawing Figure

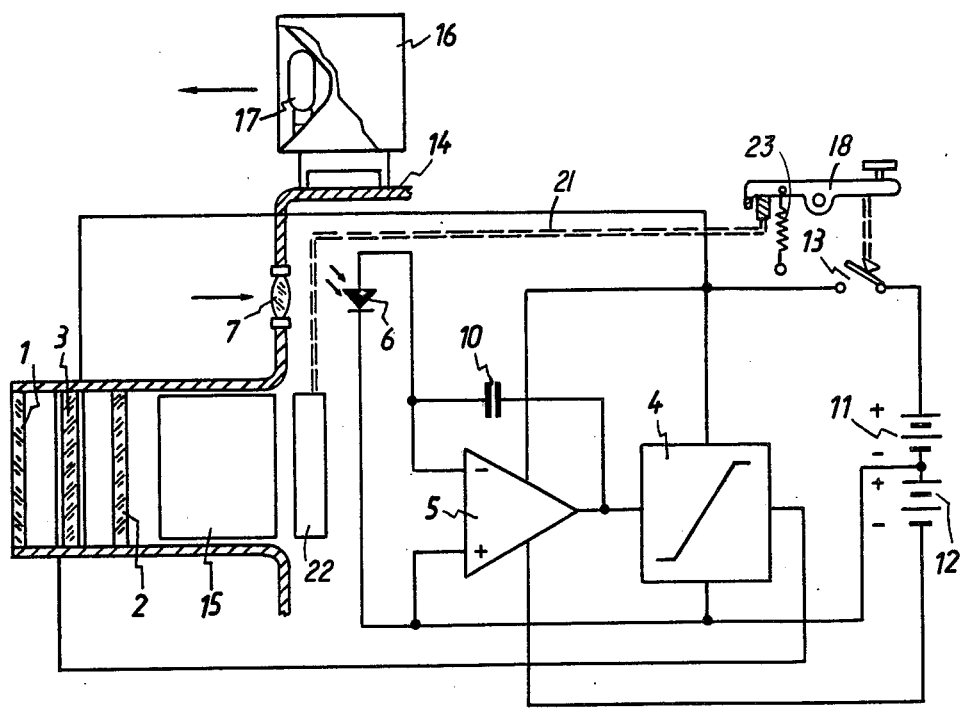

PHOTOGRAPHIC CAMERA WITH EXPOSURE CONTROL UTILIZING A PHASE CONTROLLABLE CRYSTAL

CROSS-REFERENCE TO RELATED APPLICATION

This is a continuation-in-part of my application Ser. No. 392,807, filed Aug. 23, 1973 now abandoned.

BACKGROUND OF THE INVENTION

The present invention relates to photographic cameras and in particular to such photographic cameras as are used both for taking pictures in available light and under flash conditions. Even more particularly, it relates to such cameras as have an automatic exposure control circuit which is to operate to terminate the exposure both under available light and flash light conditions.

In a known photographic camera of this type, if a photograph is to be taken under flash conditions, the sensitivity of the photoreceiver in the automatic exposure control circuit must be correspondingly altered, since the flash is terminated only after a delay depending upon the inertia of the moving parts in the camera. This delay of course can cause erroneous exposures under flash conditions where the intensity of light is extremely high and the flash duration is short.

SUMMARY OF THE INVENTION

It is an object of the present invention to furnish a photographic camera which is capable of taking pictures both under available light and under flash conditions without use of additional correcting elements when the camera is used under flash conditions. In other words, the light-sensitive measuring arrangement and the automatic exposure control system containing this measuring arrangement must be sufficiently sensitive and have sufficiently low inertia that even for flash pictures of relatively close objects the exposure time can be held to a sufficiently short duration.

The present invention thus resides in a photographic camera having film, an objective lens positioned in the path of light to said film, and an automatic exposure control circuit having a control output for furnishing a terminating signal when the exposure of said film is equal to a desired exposure. It comprises first and second polarized filter means positioned in said path of said light and having corresponding angles of polarization. It further comprises a phase controlled crystal element positioned in the path of said light between said first and second polarized filter means. It further comprises connecting means for connecting said crystal element to said control output of said automatic exposure control circuit.

In a preferred embodiment of the present invention the automatic exposure control circuit comprises a silicon photoreceiver. It further comprises differential amplifier means having a first input directly connected to said silicon photoreceiver both under available light and under flash conditions. Said differential amplifier means further have a second input connected to a means for furnishing a reference signal and a differential amplifier output. Connected to the differential amplifier output is a bistable circuit having a first and second stable state and furnishing said terminating signal when in said second stable state. It will be noted that the silicon photoreceiver and the differential amplifier constitute a light measuring circuit which operates substantially without any delay whatsoever.

In a preferred embodiment of the present invention the first and second polarized filter have substantially the same polarization angle. The crystal element is connected to the output of the bistable circuit in such a manner that light passes through the crystal element substantially without change in the angle of polarization in the absence of said terrminating signal, and passes through said crystal with a change in polarization angle corresponding to a predetermined angle in response to said terminating signal.

In a further preferred embodiment of the present invention the polarization angles of said first and second polarized filter means are substantially equal and the crystal serves to rotate the polarization angle of the light by approximately 90°.

In a further preferred embodiment of the present invention a capacitor is connected between the output of said differential amplifier and the first input of said differential amplifier. The second input of said differential amplifier is connected to a voltage divider which constitutes the means for furnishing a reference signal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE is a schematic diagram of the photographic camera using the present invention.

DESCRIPTION OF THE PREFERRED EMBODIMENTS

A preferred embodiment of the present invention will now be described with reference to the drawing.

Reference to the single FIGURE shows a first polarization filter denoted by reference numeral 1 and a second polarization filter denoted by reference numeral 2. These polarization filters constitute first and second polarization filter means and have substantially the same polarization angle. A liquid or ceramic crystal element 3 is arranged in the path of light falling on the film, between polarization filters 1 and 2. Nematic liquid crystals are utilized in a preferred embodiment of the present invention. In an alternate preferred embodiment a ferro-electric crystal (e.g. PLZT - La doped lead zirconate titanate) is used. The liquid crystal element is connected to the output of a bistable circuit 4. The input of the bistable circuit 4 is connected to the output of an operational amplifier 5. The operational amplifier is arranged as a differential amplifier having an inverting input connected to a silicon photoreceiver 6. The photoreceiver is, in a preferred embodiment of the present invention, a photodiode. The photodiode is responsive to light falling through a window 7. The light falling through window 7 constitutes a measure of the light falling on the film of the camera. The direct input of differential amplifier 5 is connected to the center tap of a voltage source. A capacitor 10 is arranged between the output of differential amplifier 5 and the above-mentioned inverting input of said differential amplifier. A first and second voltage source are denoted by reference numerals 11 and 12 respectively, while a release switch is denoted by reference numeral 13. The camera housing is denoted by reference numeral 14, while the objective is denoted by reference numeral 15. A flash cube 16 may be mounted on housing 14. A flashbulb in operating position is denoted with reference numeral 17.

Further shown in the FIGURE is a release lever 18 which is mechanically coupled to switch 13. Activation of release lever 18 closes switch 13 and further releases a lever 22 which is coupled through a gear arrangement 21 to the shutter opening member 22. A spring 23 acts to hold lever 18 in the position wherein switch 13 is open. The shutter opening member is moved to its closed position, wherein no light falls on the film, by a known mechanism not shown in the FIGURE. The return need not be timed exactly since substantially all light is blocked from the film by the polarizer-crystal combination. It must, however, have taken place before switch 13 reopens.

In a preferred embodiment of the present invention, bistable stage 4 is so arranged that a threshold value of voltage is required for it to switch from a first to a second stable state. When the bistable stage or circuit is in the first stable state, no voltage is applied to fluid crystal 3. In the absence of voltage, the crystal element 3 is neutral, that is it does not affect the light passing therethrough. If however a voltage is applied to the electrodes of the crystal element 3, that is when the bistable circuit 4 is in the second stable state, then the light passing through the crystal element is rotated by approximately 90°. Since the light falling onto the crystal element has been polarized in a predetermined direction by polarization filter 1, and then is subsequently rotated by 90° when voltage is applied to crystal element 3, the resulting light will not be passed through polarization filter 2, since this has the same polarization angle as polarization filter 1.

In an alternate preferred embodiment, the direction of polarization of polarized filters 1 and 2 differs by ninety degrees. When no voltage is applied to the crystal, no light passes through the crystal polarizer arrangement. Bistable stage 4 is so designed that a voltage is applied to the crystal when it is in the above-described first stable state. This causes the light passing through the crystal to be rotated ninety degrees, allowing it to pass through the second polarized filter 2. The exposure thus commences. When bistable stage 4 switches to the second stable state, no voltage appears at its output. No light can then pass through the crystal-polarizer arrangement and the exposure is terminated. Under this type of operation, the shutter is utilized only to block stray light and, as the crystal technology is improved, may be dispensed with entirely.

It will be noted that the arrangement of the present invention is suitable for measuring both daylight and light from a flash without time delay and further, the illumination is terminated, again substantially without delay, when the threshold value of the bistable circuit 4 has been exceeded.

While the invention has been illustrated and described as embodied in conjunction with a particular automatic exposure measuring and control circuit (and using polarization filters having substantially the same polarization angle), it is not intended to be limited to the details shown, since various modifications, circuit and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An exposure-terminating arrangement for photographic cameras capable of making flashbulb exposures, the arrangement comprising, in combination, a pair of parallel planar polarization filters, a planar phase element located intermediate the filters and parallel thereto, the filters and the phase element being arranged in the path of light entering the camera normal thereto, the phase element having two control electrodes and being operative for rotating the polarization direction of polarized light passing therethrough in dependence upon the potential difference across its two control electrodes, a light-integrating device operative for receiving scene light and generating an integral signal corresponding to the time integral of the received light, and a threshold detector circuit having an input connected to the light-integrating circuit for receipt of the integral signal and having a pair of output terminals, each control electrode of the phase element being connected only to a respective one of the threshold detector circuit output terminals and the operation of the phase element accordingly being determined exclusively by the potential difference across the threshold detector circuit output terminals, the threshold detector circuit being capable of assuming only two states, the first being a state in which it applies across the control electrodes of the phase element a potential difference causing the phase element to permit polarized light emerging through the first filter to pass also through the second filter, the second being a state in which the threshold detector circuit applies across the control electrodes of the phase element a potential difference causing the phase element to prevent polarized light emerging through the first filter from passing through the second filter, the threshold detector being in the first state when the integral signal is below a predetermined value, the threshold detector assuming its second state and accordingly causing the phase element to terminate the exposure when the integral signal reaches the predetermined value, whereby when the integral signal quickly reaches the predetermined value due to high flashbulb scene brightness levels the exposure can be immediately terminated without dependence upon the response times of moving parts.

2. An exposure-terminating arrangement for photographic cameras, the arrangement comprising, in combination, a pair of parallel planar polarization filters, a planar phase element located intermediate the filters and parallel thereto, the filters and the phase element being arranged in the path of light entering the camera normal thereto, the phase element having two control electrodes and being operative for rotating the polarization direction of polarized light passing therethrough in dependence upon the potential difference across its two control electrodes, a light-integrating device operative for receiving scene light and generating an integral signal corresponding to the time integral of the received light, and a threshold detector circuit having an input connected to the light-integrating circuit for receipt of the integral signal and having a pair of output terminals, each control electrode of the phase element being connected to a respective one of the threshold detector circuit output terminals and the operation of the phase element accordingly being determined by the potential difference across the threshold detector circuit output terminals, the threshold detector circuit being capable of assuming only two states, the first being a state in which it applies across the control electrodes of the phase element a potential difference causing the phase element to permit polarized light emerging through the first filter to pass also through the second filter, the second being a state in which the threshold detector circuit applies across the control electrodes of the phase element a potential difference causing the phase element to prevent polarized light emerging through the first filter from passing through the second filter, the threshold detector being in the first state when the integral signal is below a predetermined value, the threshold detector assuming its second state and accordingly causing the phase element to terminate the exposure when the integral signal reaches the predetermined value, whereby when the integral signal quickly reaches the predetermined value due to high scene brightness levels the exposure can be immediately terminated without dependence upon the response times of moving parts.

3. An arrangement as defined in claim 2, the phase element being a liquid crystal element.

4. An arrangement as defined in claim 2, the potential difference applied by the threshold detector circuit across the phase element control electrodes being zero in one of the states of the threshold detector circuit and non-zero in the other of the states of the threshold detector circuit.

5. An arrangement as defined in claim 2, the polarization directions of the first and second polarization filters being at least approximately the same, the polarized light emerging through the phase element having the polarization direction of the polarization filters when the threshold detector circuit is in its first state and having a polarization direction differing therefrom by ninety degrees when the threshold detector circuit is in its second state.

6. An arrangement as defined in claim 2, the light-integrating circuit comprising a differential amplifier having a positive input and a negative input, a photodiode located to be exposed to scene light, the photodiode being connected across the inputs of the differential amplifier, means for applying to one input of the differential amplifier a reference voltage determinative of the predetermined value, the output of the differential amplifier constituting the output of the light-integrating device.

7. An arrangement as defined in claim 6, the differential amplifier being an operational amplifier having a positive input and a negative input, the means for applying the reference voltage comprising a voltage source having a tap connected to one input of the operational amplifier, the light-integrating circuit furthermore including an integrating capacitor connected between the output and the other input of the operational amplifier.

* * * * *